(12) United States Patent
Webber et al.

(10) Patent No.: US 12,148,065 B2
(45) Date of Patent: Nov. 19, 2024

(54) AUGMENTED REALITY AESTHETIC INTERFACE ECOSYSTEM

(71) Applicant: ARAURA AUGMENTED REALITY FASHION CORP., Montreal (CA)

(72) Inventors: Michael Webber, Montreal (CA); Jesse Cizauskas, New Taipei (CN); Krzysztof Zielinski, New Taipei (CN); Connor Harty, Montreal (CA)

(73) Assignee: ARAURA AUGMENTED REALITY FASHION CORP., Montreal (CA)

( * ) Notice: Subject to any disclaimer, the term of this patent is extended or adjusted under 35 U.S.C. 154(b) by 5 days.

(21) Appl. No.: 17/919,042

(22) PCT Filed: Jul. 6, 2021

(86) PCT No.: PCT/CA2021/050916
§ 371 (c)(1),
(2) Date: Oct. 14, 2022

(87) PCT Pub. No.: WO2022/006661
PCT Pub. Date: Jan. 13, 2022

(65) Prior Publication Data
US 2023/0245350 A1    Aug. 3, 2023

Related U.S. Application Data

(60) Provisional application No. 63/048,653, filed on Jul. 7, 2020.

(51) Int. Cl.
*G06T 11/00* (2006.01)
*G06Q 30/0601* (2023.01)
*G06T 19/00* (2011.01)

(52) U.S. Cl.
CPC .......... *G06T 11/00* (2013.01); *G06Q 30/0621* (2013.01); *G06T 19/006* (2013.01)

(58) Field of Classification Search
CPC ..... G06T 11/00; G06Q 30/0621; G06F 3/011; G06F 3/012
See application file for complete search history.

(56) References Cited

U.S. PATENT DOCUMENTS

| 2016/0210602 A1 | 7/2016 | Siddique et al. |
| 2019/0073798 A1 | 3/2019 | Du |

(Continued)

OTHER PUBLICATIONS

International Search Report; PCT/CA2021/050916; Aug. 17, 2021; Hamed Abdallah.

*Primary Examiner* — Jeffery A Brier
(74) *Attorney, Agent, or Firm* — BENOIT & COTE

(57) ABSTRACT

A complete augmented reality platform and associated ecosystem allow the expressive power of augmented reality to be live as an overlay onto the physical world and be experienced by a plurality of users in any physical space. The ecosystem allows for the democratization and facilitation of publishing and adorning via AR to an open platform where users can create, edit, own, view, buy, sell etc. a plurality of unique augmented reality virtual objects and aesthetic or utilitarian design elements. Further, the ecosystem allows for any users participating in the ecosystem to integrate one or more of the plurality of their purchased design elements into their daily real-world experiences wherein design elements can be overlaid as desired. Additionally, the ecosystem provides a means for expanding the existing marketplace for goods and services into the augmented reality space.

20 Claims, 8 Drawing Sheets

(56) References Cited

U.S. PATENT DOCUMENTS

2019/0392483 A1 12/2019 Franklin et al.
2022/0284648 A1* 9/2022 Guha Thakurta ...... G06Q 50/01

* cited by examiner

AUGMENTED REALITY AESTHETIC INTERFACE ECOSYSTEM

CROSS-REFERENCE TO RELATED APPLICATION

This application claims priority from U.S. provisional patent application 63/048,653 filed Jul. 7, 2021, the specification of which is hereby incorporated herein by reference in its entirety.

BACKGROUND

(a) Field

The subject matter disclosed generally relates a system and method for online shopping and more particularly to such a system and method in which a customer can virtually model an item. The present invention has particular, but not exclusive, utility in terms of apparel shopping on the Internet and displaying the apparel items in a personal augmented reality and social augmented reality.

(b) Related Prior Art

Virtual reality is a computer-generated simulation of an environment (e.g., a 3D environment) that users can interact with in a seemingly real or physical way. A virtual reality system, which may be a single device or a group of devices, may generate this simulation for display to a user, for example, on a virtual reality headset, a smart phone or some other display device. The simulation may include images, sounds, haptic feedback, and/or other sensations to imitate a real or imaginary environment. As virtual reality becomes more and more prominent, its range of useful applications is rapidly broadening. The most common applications of virtual reality involve games or other interactive content, but other applications such as the viewing of visual media items (e.g., photos, videos) for entertainment or training purposes are close behind. The feasibility of using virtual reality to simulate real-life conversations and other user interactions is also being explored.

Augmented reality provides a view of the real or physical world with added computer-generated sensory inputs (e.g., visual, audible). In other words, computer-generated virtual effects may augment or supplement the real-world view. For example, a camera on a virtual reality headset may capture a real-world scene (as an image or video) and display a composite of the captured scene with computer-generated virtual objects. The virtual objects may be, for example, two-dimensional and/or three-dimensional objects, and may be stationary or animated.

An example of such exploration in that field is provided by US patent Application 2018/0096506 in which is described a method which includes sending information configured to render a virtual room on a display device associated with a user, wherein the virtual room comprises a visual representation of the user and a virtual mirror that displays a virtual reflection of the visual representation of the user; receiving a first input from the user selecting a visible feature on the visual representation of the user; presenting one or more alternative options to the user, each of the alternative options corresponding to a variation of the selected visible feature; and receiving a second input from the user selecting a particular alternative option corresponding to a particular variation of the selected visible feature; and causing the visual representation of the user to be modified such that the particular variation of the selected visible feature is implemented.

Some commercial products like TikTok™ provide filters that allow a user to apply such a filter to the image capture by their devices and to share these images to other users. They do not provide augmented reality solutions, but rather simple modifications or processes performed over image or video captured.

Other commercial products such as Pokenom Go™ provide geo-tag-based applications wherein the user moving to a particular location, and the device detecting its presence in a trigger location triggers a game play, an animation, or another type of reward for having reached the destination. But regardless of these products depending in part on reality data to the process and/or the reward, they do not provide augmented reality solution.

In parallel, many explorations of online shopping solutions and of transactions of virtual goods such as game-related content have been performed.

However, needs remain for an augmented reality transactional ecosystem providing the environment for users to express their innovative view and individuality online in a fulfilling fashion while providing a solution for transactions of virtual goods, and particular virtual apparels.

SUMMARY

Accordingly, an augmented reality aesthetic interface ecosystem is provided. The ecosystem provides a looking glass into a futurist world where users express themselves and enhance the visual aesthetics of their world by attaching virtual objects to themselves or to other physical or virtual objects which are made publicly visible to anyone on the platform. The ecosystem consists of an online platform that allows users to create, edit, view etc. a plurality of augmented reality aesthetic design elements. The plurality of design elements may be static or dynamic in nature within an augmented reality space. Further, the plurality of design elements may have any desired shape, size, color, animation etc. and are limited only by the creative capacity of the given user. The plurality of design elements may adorn any real-world or augmented reality item including, but not limited to, a human body, an animal, buildings, vehicles, plant life, other existing augmented reality aesthetic design elements and similar items or any combinations thereof.

According to an embodiment, there is provided a method to generate an augmented reality image comprising a composite view of a physical model and at least one virtual good associated with a user account. The method comprises capturing with a processing device an image of the physical model associated with the user account; generating a digital mapping based on the captured image; generating an augmented reality image; and displaying in real-time the augmented reality image on the processing device. Generating an augmented reality image comprise accessing an ownership registry listing the at least one virtual good associated with the user account; having a first digital model of a first one of the at least one virtual good; and using the digital mapping to blend first digital model with the captured image into an augmented reality image. The augmented reality image responds to movements of at least one of the physical model and the processing device.

According to another embodiment, there is provided a method to generate an augmented reality image comprising a composite view of a physical model, a first virtual good and at least a second virtual good. The method comprises capturing with a processing device an image of a physical model associated with a user account; generating a digital mapping based on the captured image; generating an augmented reality image; and displaying in real time the augmented reality image. Generating an augmented reality image comprises having a first digital model of the first virtual good; having a second digital model of the second virtual good; having display preference data used to establish a method of blending the first digital model and the second digital model based on the digital mapping; using the digital mapping to blend the first digital model and the second digital model with the captured image according to the method of blending into an augmented reality image. The augmented reality image responds to movements of at least one of the physical model and the processing device.

According to an aspect, any one of the methods further comprises having display preference data used to establish a method of blending the first digital model with the captured image, wherein the step of generating the augmented reality image comprises determining the method of blending based to the display preference data.

According to an aspect, in any one of the methods the step of blending the augmented reality image comprises establishing interference between the first digital model and the captured image; and resolving the interference according to the display preference data.

According to an aspect, in any of one the methods, the step of having display preference data comprises associating with the first digital model a position data set relative to the digital mapping.

According to an aspect, any one of the methods further comprises defining a plurality of display zones in the digital mapping, wherein said display zone is one of a front zone, a digital mapping zone, and a background zone, and associating one of the plurality of display zones to the first one of the at least one virtual good.

According to an aspect, any of the methods further comprises associating display parameters with the first digital model, wherein the step of generating the augmented reality image comprises displaying an image of the first virtual good based on the display parameters of the first digital model, and wherein the display parameters comprise at least one of a time-based parameter, a position-based parameter, an event-based parameter, and a view-angle-based parameter.

According to an aspect, any one of the methods further comprises having a display policy comprising a viewer profile parameter associated with each one of the at least one virtual good; and determining a viewer profile for a viewer, wherein the viewer profile comprises at least one viewer profile parameter, wherein the step of generating the augmented reality image comprises determining whether or not to integrate the first virtual good in the augmented reality image based on correspondence between the display policy and the viewer profile parameter.

According to an aspect, any one of the methods further comprises evaluating if an ownership status associated with the first virtual good fulfills a requirement, and upon the ownership status failing to fulfil the requirement, preventing at least one of: transferring the first virtual good; modifying the first virtual good; displaying the first virtual good to the user; and displaying the first virtual good to a viewer.

According to an aspect, in any one of the methods the first virtual good is one of a 3D object, a 2D object, an adornment, an aura, a font, a script, an effect, an environmental element, a sound, and a virtual pet.

According to an aspect, one any one of the methods the first virtual good is made of a plurality of combined virtual sub-goods.

According to an aspect, any one of the methods further comprises the user selecting a layering characteristic for a first one of the at least one virtual goods; and the user selecting a second layering characteristic for a second one of the at least one virtual good, wherein the first layering characteristic and the second layering characteristic are structured hierarchically.

According to an aspect, in any one of the methods the digital mapping comprises a plurality of mapping points distributed in a plurality of zones, the plurality of zones comprising at least two of a head zone, a body zone, a halo zone and a vicinity zone, wherein the display preference data comprises an association of at least one of the mapping points located in at least one of the zones with the first virtual good.

According to an aspect, any one of the methods further comprises detecting the physical model using a viewer device applying an identification method; the viewer device transmitting a viewer profile and an identification of at least one of the physical model and a user account to at least one server; and the viewer device receiving a view authorization from at least one of the one server, wherein the viewer device is adapted to generate the augmented reality image of the physical model; and display the augmented reality image to the viewer.

According to an aspect, in any one of the methods the identification method comprises at least one of: managing a notification; detecting a beacon generated by a user's device; and performing an image recognition process of the physical model.

According to an aspect, in any one of the methods the image recognition process comprises a facial recognition process.

According to an aspect, in any one of the methods the physical model is one of the user's body, the user's head, and a physical object owned by the user.

According to an aspect, any one of the methods comprises associating ownership data with a first one of the at least one virtual good; evaluating the ownership data in association with the first virtual good; and when the step of evaluating the ownership data does not fulfill a requirement, preventing at least one of: transferring the first virtual good; modifying the first virtual good; displaying the first virtual good to the user; and displaying the first virtual good to a viewer.

According to an aspect, in any one of the methods a registry stores information regarding at least one of ownership, value history, provenance data, chain of ownership and commoditization of the first virtual good. According to an aspect, the first virtual good has a unique identity and is non-fungible. According to an aspect, the unique first virtual good has a non-fungible encrypted token associated therewith.

According to an embodiment, there is provided a server cluster for managing datasets allowing to transmit data to be used by a personal processing device to display an augmented reality image comprising a composite view of a) a physical model captured by the personal processing device and b) at least one virtual good, wherein the physical model and the at least one virtual good are associated with a user account, the server cluster comprising at least one server comprising a processing unit, a memory and a communication interface. The server cluster is adapted to store a first digital model of a first one of the at least one virtual good each associated with the user account; to store an identification of at least one of the physical model and a device associated with the user account; to store display preference data comprising a blending method of the first virtual good with a captured image of the physical model; —through the communication interface, to receive from the personal processing device identification data generated by an identification method; to retrieve the first digital model from the memory and the blending method associated therewith based on identification data; and to transmit either i) the first digital model and the blending method or ii) the augmented reality image to the personal processing device. The personal processing device is adapted to display in real-time the augmented reality image generated based on the first digital model and the blending method, and wherein the augmented reality image responds to movements of at least one of the physical model and the personal processing device.

According to another embodiment, there is provided a server cluster for managing datasets allowing to transmit data to be used by a personal processing device to display an augmented reality image comprising a composite view of a) a physical model captured by the personal processing device, a first virtual good and b) at a second virtual good, the server cluster comprising at least one server comprising a processing unit, a memory and a communication interface. The server cluster is adapted to store a first digital model of the first virtual good and a second digital model of the second virtual good; to store display preference data comprising a blending method of the first virtual good and the second virtual good with a captured image of the physical model; to receive from the personal processing device identification data generated by an identification method; to retrieve the first digital model and the second digital model from the memory and the blending method associated therewith based on identification data; and to transmit either i) the first digital model, the second digital model and the blending method or ii) the augmented reality image to the personal processing device. The personal processing device is adapted to display in real-time the augmented reality image generated based on the first digital model, the second digital and the blending method, and wherein the augmented reality image responds to movements of at least one of the physical model and the personal processing device.

According to an aspect, any one of the server clusters is further adapted to store display parameters associated with the first digital model, wherein to generate the augmented reality image comprises displaying an image of the first virtual good based on the display parameters of the first digital model, and wherein the display parameters comprise at least one of a time-based parameter, a position-based parameter, an event-based parameter, and a view-angle-based parameter.

According to an aspect, any one of the server clusters is further adapted to store a display policy comprising a viewer profile parameter associated with the first virtual good; to receive a viewer profile of a viewer, wherein the viewer profile comprises at least one viewer profile parameter; and to determine whether or not to transmit the first virtual good based on correspondence between the display policy and the viewer profile parameter.

According to an aspect, any one of the server clusters is further adapted to associate with and to store ownership data of the first virtual good; to evaluate the ownership data of the first virtual good; and if the evaluation of the ownership data does not fulfill a requirement, to prevent at least one of: transferring or accepting transfer of the first virtual good; modifying or accepting modification of the first virtual good; and the first digital model to be transmitted to the personal processing device.

According to an aspect, any one of the server clusters is adapted to store a user account having account parameters associated therewith; to store a viewer account having account parameters associated therewith; to receive identification of the viewer account; to establish a view dataset based on comparison of the account parameters of the user account to the account parameters of the viewer account; to establish a respecting status for each of the first virtual good and the second virtual good based the first virtual good and the second virtual good respecting the view dataset; and to prevent any of the first virtual good and the second virtual good having a negative respecting status to be transmitted.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
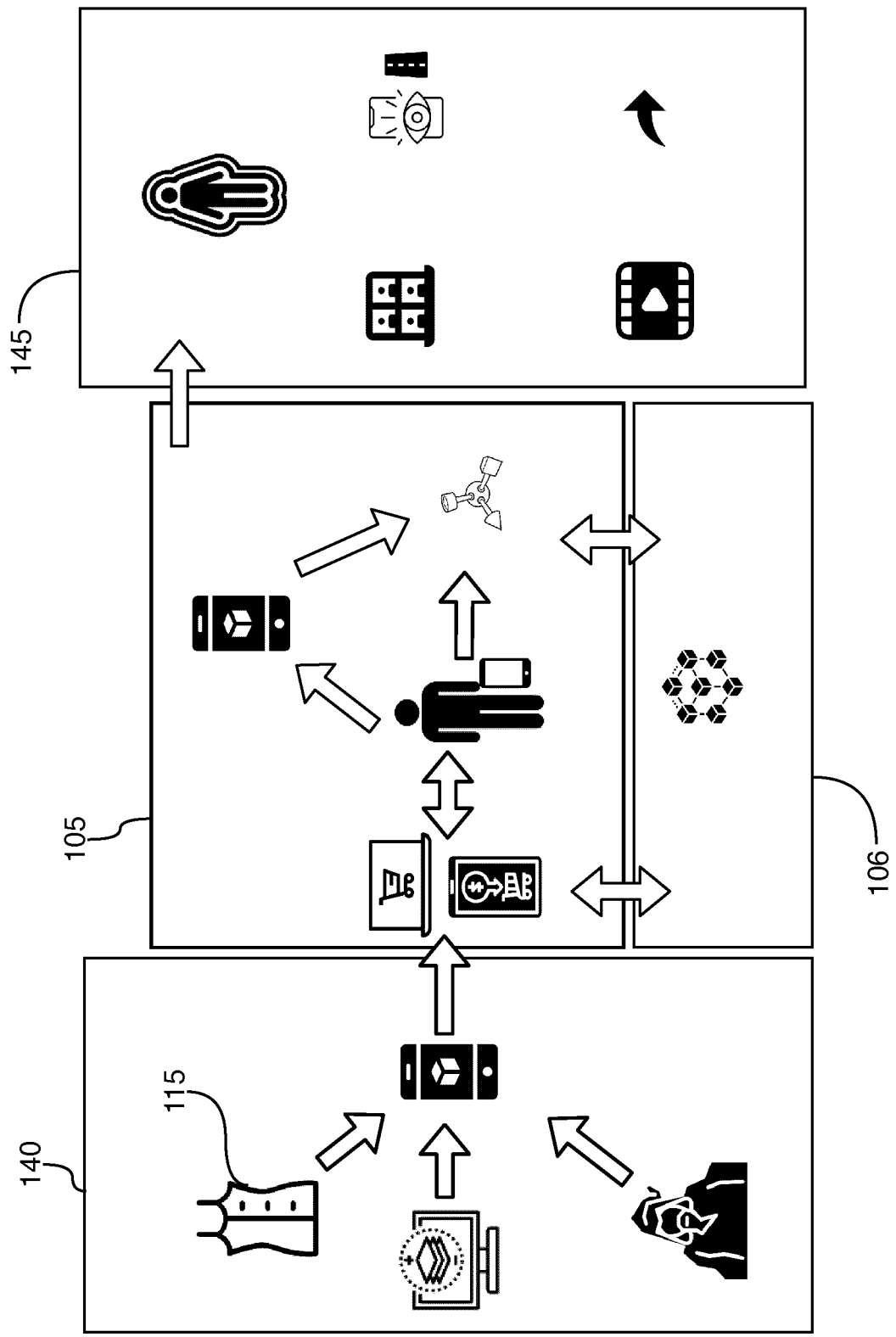
FIG. 1 is a schematic of the ecosystem in accordance with an embodiment.

The realizations will now be described more fully hereinafter with reference to the accompanying figures, in which realizations are illustrated. The foregoing may, however, be embodied in many different forms and should not be construed as limited to the illustrated realizations set forth herein.

With respect to the present description, references to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

In the following description, it is understood that terms such as "first", "second", "top", "bottom", "above", "below", "front", "rear" and the like, are words of convenience and are not to be construed as limiting terms.

In the following description, the terms "choose", "select", "pick", etc. in relation with a user are intended to be construed as an action of a user resulting in data in the ecosystem.

It will be noted that throughout the appended drawings, like features are identified by like reference numerals.

Referring to FIG. 1, in realizations there are disclosed augmented reality ecosystem comprising content providers, a content publishing solution, a marketplace, one or more backbone servers assembled in a centralized or preferably a decentralized server cluster, an augmented reality mixer and an augmented reality viewer.

In the present context, content providers should be understood as someone who creates and supplies virtual goods, and particularly wearable virtual goods such as apparel items, that is to be published to the ecosystem.

Publishing should be understood as a process through which items are approved, certified, serialized and made available as sellable assets within a registry.

Marketplace should be understood as a virtual place to buy, sell, and re-sell virtual goods from the registry.

Cluster server and backbone server(s) should be understood as software and hardware comprising one or more servers that is the underlying technology that enables adornment of virtual goods, that manages permissions and that locates and/or identifies users in the ecosystem, aka augmented reality metaverse.

The registry, aka virtual goods and digital rights management registry, should be understood as one or more databases where are stored and managed data relative to virtual goods and users, comprising certificate of authenticity and ownership, provenance and chain of ownership, and digital ledgers, to list a few.

Augmented reality mixer should be understood as technology (hardware and software) that allows to mix, match, add and blend virtual goods and effects to a virtual good for adornment. It allows to save customizations and publish the customizations in the augmented reality metaverse.

Viewer should be understood, based on context, either as the person operating the device, aka viewing user, or the technology (hardware and software) that allows users to view the virtual goods in an augmented reality, aka viewer device, thus within the metaverse. Particularly, augmented reality views (aka augmented reality images) are typically provided though personal devices such as computers and moreover through smart devices such as smart phones and smart glasses.

FIG. 1 depicts schematically a representation of the augmented reality ecosystem with functional relationship between them, comprising a cluster server 140 in communication with processing devices 105 operating software 106 to configure and generate augmented reality images in the metaverse 145.

Figure 2:
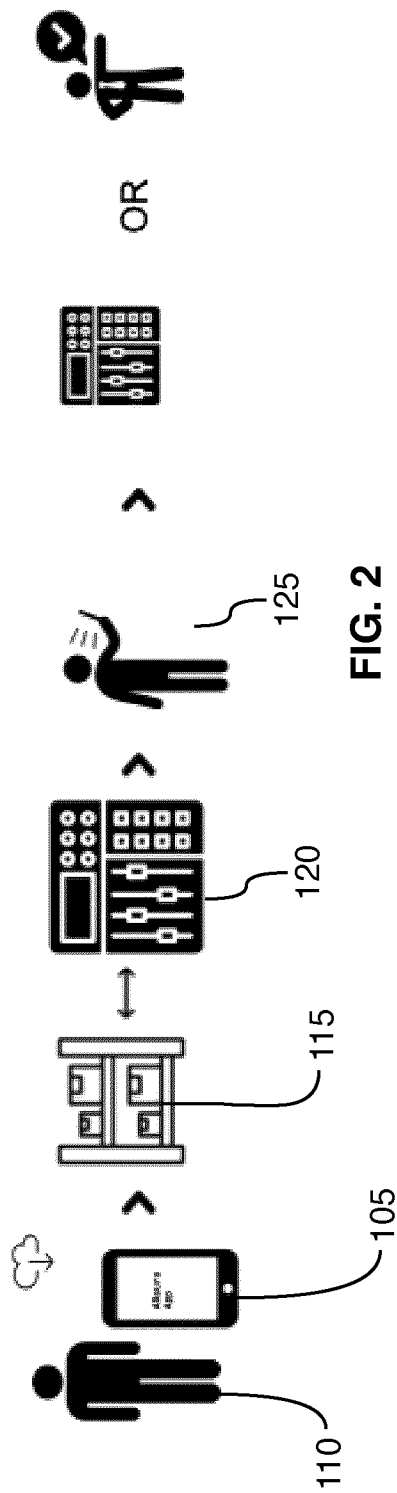
FIG. 2 is a schematic depicting a process of customizing and activating an augmented reality image of a user in the ecosystem of FIG. 1.

FIG. 2 depicts the process of a user adorning an augmented reality aura. The process comprises a user 110 of a personal device updating the content of the personal device 110 with a collection of virtual goods 115. It comprises customizing 120 the augmented reality with potentially multiple virtual goods 115, to validate the customization or change the customization or register the customization 125 to be live, in other words to be used to show the virtual goods 115 in an augmented reality view.

Figure 3:
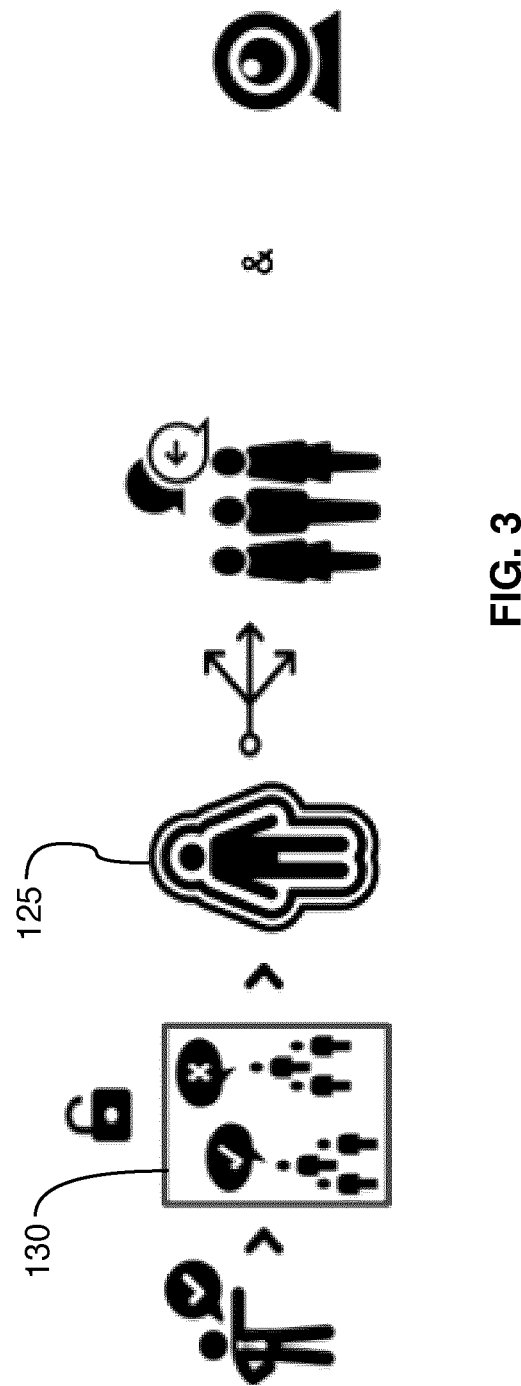
FIG. 3 is a schematic depicting a process through which an augmented reality image of a user becomes available to viewers in the ecosystem of FIG. 1.

FIG. 3 depicts the process to go live, from the step of setting permissions 130 in the system, to go live 125. In a social augmented reality, the process comprises to notify nearby members of the metaverse 145 (FIG. 1) and to allow the augmented reality view to be broadcasted via webcam.

Figure 7:
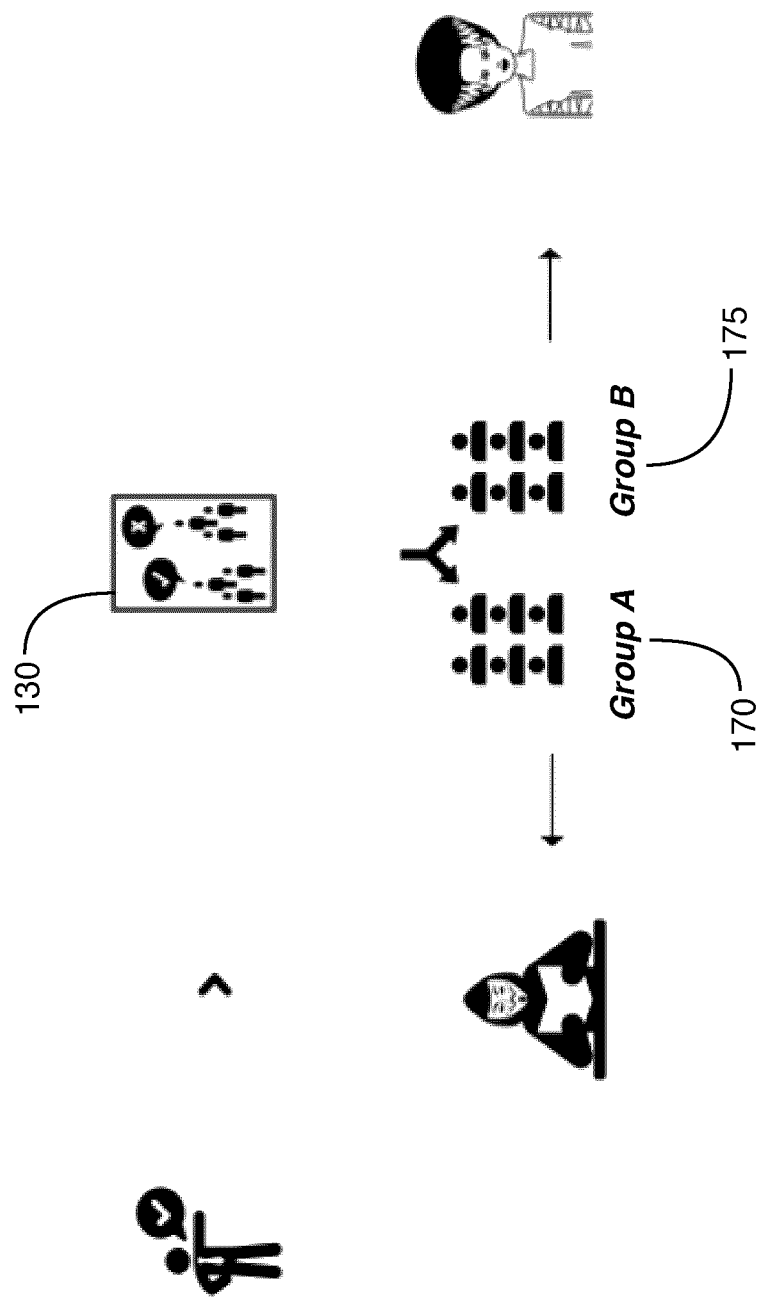
FIG. 7 is a schematic depicting the implementation of display policies in relation with augmented reality images.

FIG. 7 depicts the process of managing rights 130 to individual and/or groups whereby a user broadcasts multiple augmented reality versions, and wherein based on user data, view data and correlation between the data (e.g., member of a same group), a particular augmented reality version is displayed to a viewing user while another augmented reality version is displayed to another viewing user having different data associated therewith, e.g. viewing user of Group A seeing version A while viewing user of Group B seeing version B of the augmented reality of the user.

One should understand from the description before that rights, user accounts, and other information are registered, centrally managed, authenticated, compared, and/or broadcasted in order for some information to be broadcasted or transmitted to particular viewer devices while preventing the same information to be broadcasted or transmitted to other viewer devices. It should also be understood that the information may be tailored to viewing user(s) or group of viewers based on viewer information, rights and/or display rights.

In augmented reality views, the virtual goods are particularly designed to be displayed in one of four display zones (see FIG. 4) comprising a head zone 152, a body zone 154, a halo zone 156 and an environmental zone 158, wherein one or more areas (see FIG. 5) may be associated with each of the zones 152, 154, 156 and 158.

The head zone 152 is defined around the head of the user, wherein the virtual good(s) is displayed covering at least a portion of the head of the user. Examples comprise a crown covering the top of the head, a virtual tattoo covering a portion of the visible skin, and a helmet covering the totality of the head, both according to a front view, a side view, and a rear view of the user.

The body zone 154 is defined similarly to the head zone 152 but refers to body parts below the chin of the user.

The halo zone 156 is defined as a virtual space at a set distance, aka vicinity area, from the head or body of the user wherein custom surrounding(s) may be set.

The environment zone 158 consist in the space viewable by the camera that is outside the other zones listed before. The environment zone 158 is ideal for displaying for example a pet or other animation with no or limited interaction with the user.

The virtual goods are further divided into two categories: virtual items and customizations.

The virtual items are designed self-standing virtual goods to be displayed according to one or more areas, aka a spatial relationship to the user (see FIG. 5), typically to be displayed to appear in the front area 162 in front of the user, in the rear area 164 behind the user or the surrounding area 166 surrounding the user. Typically, multiple virtual goods may be placed onto a user for each area and different effects may be utilized per area. The present solution also provides a capability for blending between areas so that virtual goods can overlap and utilize transparencies. Any object, mapped onto any of the four areas 152, 154, 156, and 158 may go into any of the areas 162, 164, and 166.

Customizations are additions and modifications to virtual items and/or user. For instance, changes in color, effects varying based on time, viewing angle, position, etc. are such customizations. All virtual goods that are not self-standing but rather effects and/or other kind of enhancement, customization, or adornment of a virtual item and/or the user thus falls into that category.

The present environment allows to concurrently use a plurality of virtual items, customizations and/or a mix of one or more of the two types for a user to provide the desired adornment to their image in the augmented reality.

According to embodiments, customizations may have trigger(s) associated therewith, e.g., a wink of the user, resulting in the customization being initiated, ended, or moving to another phase (or configuration or parameter) upon detection of the trigger.

Therefore, the present solution may be described as a method to generate an augmented reality image comprising a composite view of a physical model, usually a user, and at least one virtual good, usually associated with a user account. The method comprises capturing with a processing device an image of the physical model (associated with the user account); generating a digital mapping based on the captured image; generating an augmented reality image; and displaying in real-time the augmented reality image on the processing device. Accordingly, the method allows to display an augmented reality image or video that responds to movements of at least one of the physical model and the processing device.

According to a realization, generating an augmented reality image comprises accessing an ownership registry listing the at least one virtual good associated with the user account; having a first digital model of a first one of the at least one virtual good; and using the digital mapping to blend first digital model with the captured image into an augmented reality image. Such registry may be stored on the cloud, on a server cluster comprising one or more servers having hard drive(s) to provide accesses and respond to requests of devices using virtual goods in the present augmented reality, aka metaverse.

According to a realization, generating an augmented reality image comprises having a first digital model of a first virtual good; having a second digital model of a second virtual good; having display preference data used to establish a method of blending the first digital model and the second digital model based on the digital mapping; and using the digital mapping to blend the first digital model and the second digital model with the captured image according to the method of blending into the augmented reality image to be displayed.

It is to be noted that the term "blending" refers to the process of combination and/or concurrent usage of the virtual goods toward a common result. Therefore, blending may involve, without being limited to, the visual rendering of the virtual goods. However, blending may involve non-visual characteristics of the virtual goods, for example with virtual goods falling in the customization category.

The described method contemplates having display preference data used to establish a method of blending the first digital model with the captured image, wherein the step of generating the augmented reality image comprises determining the method of blending based to the display preference data. It may comprise establishing interference between the first digital model and the captured image; and resolving the interference according to the display preference data. It may comprise associating with the first digital model a position data set relative to the digital mapping.

The described method further contemplates having a plurality of display areas in the digital mapping, wherein the display areas comprise a front area, a digital mapping area of the surface of the physical model, and a background area, and associating at least one of the display areas to the virtual goods.

The method may comprise associating display parameters with the digital models, wherein the step of generating the augmented reality image comprises displaying an image of the first virtual object based on the display parameters of the first digital model, and wherein the display parameters comprise at least one of a time-based parameter, a position-based parameter, an event-based parameter, and a view-angle-based parameter. An example of model with time-based parameters may be a model displayed differently over time. An example of model with position-based parameters or the model changing is display characteristics when moved from a first position to another. An example of model with event-based parameters may be a model displayed only after occurrence of an event, a trigger, controlled by the user, e.g., a wink. An example of model with event-based parameters may be a model displayed may be a model displayed differently based on the position of the camera capturing the image relative to the model.

The described method also contemplates having a display policy comprising a viewer profile parameter associated with the virtual goods; and determining a viewer profile for a viewer, wherein the viewer profile comprises at least one viewer profile parameter. Accordingly, the step of generating the augmented reality image comprises determining whether or not to integrate a virtual good in the augmented reality image based on correspondence between the display policy and the viewer profile parameter.

The described method also contemplates evaluating if an ownership status associated with a virtual good fulfills a requirement, and upon the ownership status failing to fulfil the requirement, preventing at least one of: transferring the virtual good; modifying the virtual good; displaying the virtual good to the user; and displaying the virtual good to a viewing user.

The described method also contemplates virtual goods such as but not limited to a 3D object, a 2D object, an adornment, an aura, a font, a script, an effect, an environmental element, a sound, and a virtual pet. It therethrough contemplates that virtual goods are any virtual object and aesthetic or utilitarian design that can be attached to any real world or virtual objects and aesthetic or utilitarian design element. It is to be noted that virtual goods may be made of a plurality of combined virtual sub-goods.

The described method also contemplates the user selecting layering characteristics for the virtual goods, wherein the layering characteristics are structured, managed and applied hierarchically.

The described method also contemplates the digital mapping comprising a plurality of mapping points distributed in a plurality of zones. The plurality of zones comprising for the example of a user a head zone 152 (FIG. 4), a body zone 154, a halo zone 156, and a vicinity zone 158, wherein the display preference data comprises an association of at least one of the mapping points located in at least one of the zones with the virtual good to be part of the augmented reality image.

The described method also contemplates a viewing user detecting the physical model using a viewer device, e.g., a smart phone or smart glasses, and applying an identification method; the viewer device transmitting a viewer profile and an identification of at least one of the physical model and a user account to at least one server; the viewer device receiving a view authorization from at least one of the one server, wherein the viewer device is adapted to: generate the augmented reality image of the physical model and to display the augmented reality image to the viewing user. Thus, an augmented reality version of the user may be seen by the viewing user. The identification method may comprise managing a notification; detecting a beacon generated by a user's device; and/or performing an image recognition process of the physical model. The image recognition process may consist in a facial recognition process when the physical model is a user.

The described method also contemplates the physical model being one of the user, the user's body, the user's head, and a physical object owned by the user such as a car, a building, or even an item of clothing worn by the user. It also contemplates any number of real-world goods, for example a shirt in a retail store (owned by the manufacturer, i.e., Adidas™), a bottle of Coke™ (identified by e.g., a QR code), a display stand/section on a shelf, or urban furniture (i.e., a bus stop, a park bench).

The described method also contemplates having a registry that stores information regarding at least one of ownership, value history, provenance data, chain of ownership and commoditization of the virtual goods. A non-fungible token may be associated with the virtual goods, whereby ensuring that the virtual goods cannot be duplicated. The non-fungible token may be encrypted.

It is herein contemplated that the non-fungible tokens allow to manage ownership over different devices associated with a user account (typically stored and manager on the cloud) of the user owning the virtual good. It allows to have every virtual good managed as an individual item even amongst a set of like items, e.g., tooth 27 of a virtual good comprising 100 orc teeth).

It further allows to have and manage an open marketplace wherein creators and curators may offer, sell, and lease virtual goods. Such marketplace may thus be a central hub for all distribution and exchange of virtual goods. The marketplace may further provide tools for importing virtual goods from other sources, such as games, in the metaverse, whereby, e.g., a person may wear in the metaverse the same outfit as their alias wears in a game played by the user.

Such tools may comprise a method for automating a mapping process for fitting virtual goods to people (aka an Artist tool standard), when the source code of the virtual good is initially defined in another environment, e.g., a game.

Figure 4:
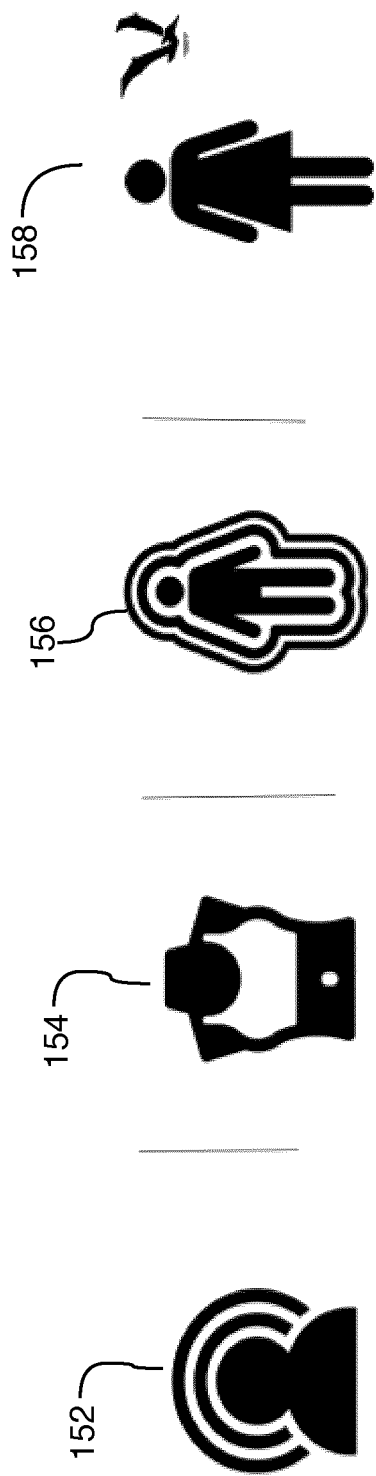
FIG. 4 is a schematic depicting zones in relation with augmented reality images.
Figure 5:
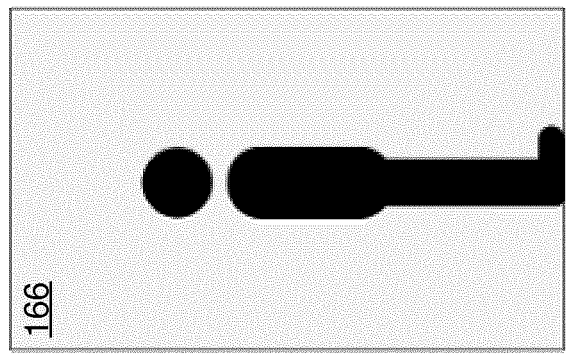
FIG. 5 is a schematic depicting display areas for virtual goods.
Figure 5:
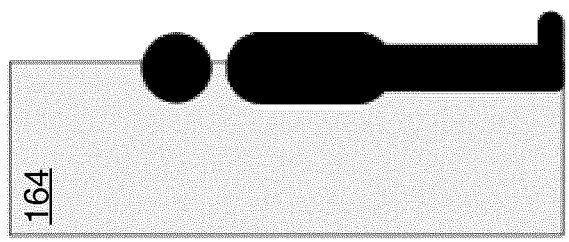
Figure 5:
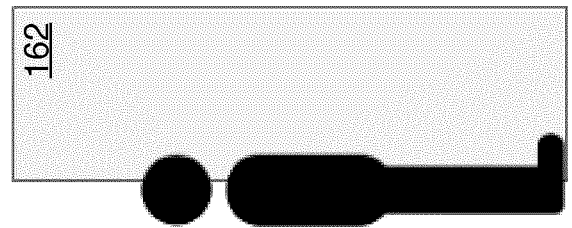
Figure 6:
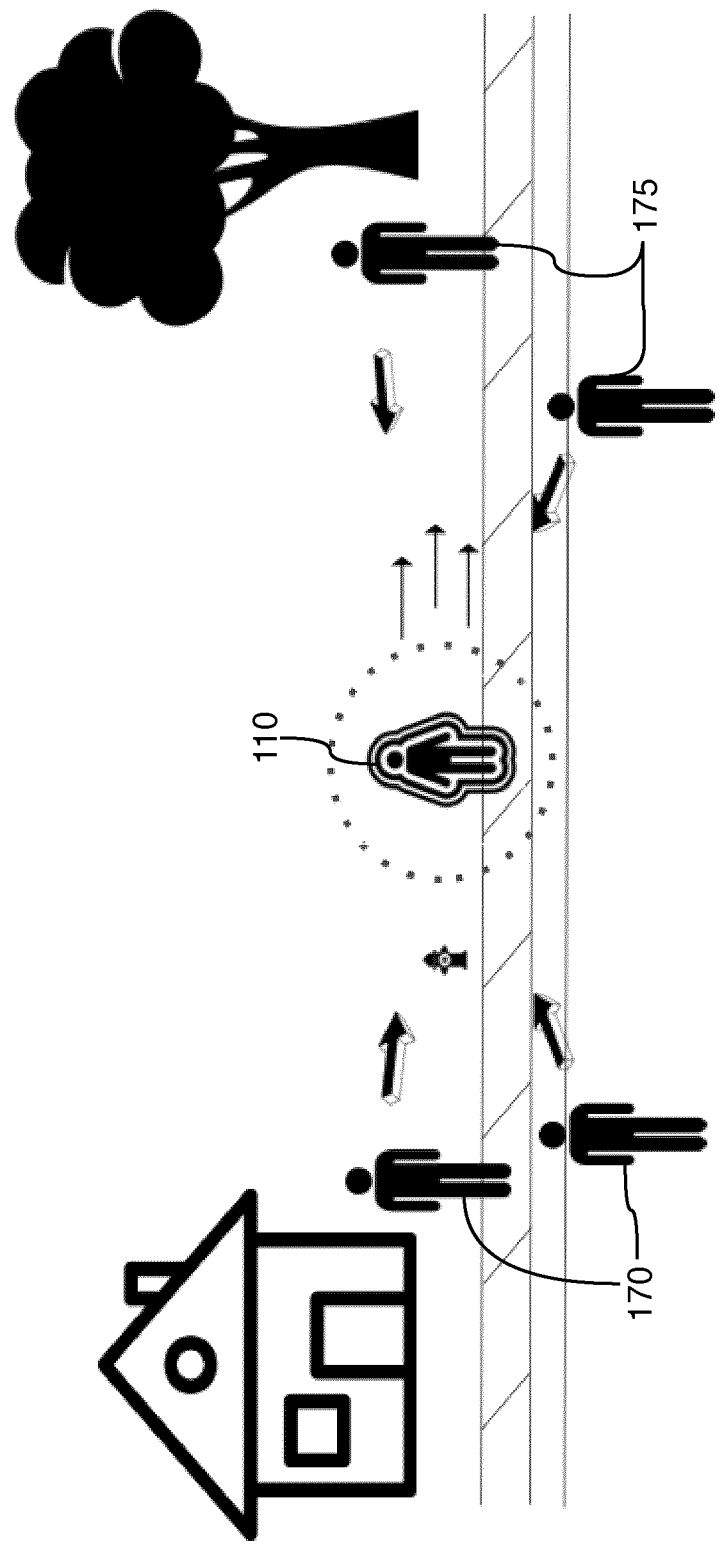
FIG. 6 is a schematic depicting viewer recognizing a user with their personal devices, and viewing the different augmented reality images of the user.

Referring to FIGS. 1 and 4 and referring additionally to FIGS. 6 and 7, the present solution and associated metaverse allows to see a user according to a particular aura, aka an augmented reality image based on a blending of virtual goods and a captured image of the user based on digital mapping of the user, wherein the augmented reality image is authorized by the user. For instance, as illustrated on FIG. 6, the viewing users 170 on the left side see a first augmented reality version of the user 110, while the viewing user 175 on the right side see a second augmented reality version of the user 110 that includes a halo since the viewing devices display the image of the user according to viewers' account data and user's display policies. According to data, the first augmented reality version may comprise no, one or more virtual goods while the second augmented reality version may comprise from none, one or more virtual goods common to the first augmented reality image.

Accordingly, the system uses display policies comprising viewer profile parameters associated with each of the virtual good and the second virtual good to determine a viewer profile for a viewing user, wherein the viewer profile comprises at least one viewer profile parameter. The step of generating the augmented reality image thereby comprises determining whether to integrate the first item and the second item in the augmented reality image based on correspondence between the display policy and the viewer profile parameter.

Referring to FIG. 7 for illustration, display policies allow to segregate the viewing users in groups 170 and 175, wherein the augmented reality images of oneself available to viewing user of a first group 170 are different than the augmented reality images available to the views of the second group 175.

To perform such a process, the system is adapted for identifying the physical model, e.g., user, using a viewer device; the viewer device transmitting a viewer profile and a user identification to a server cluster; and the viewer device receiving data from the server cluster necessary to generate and display in real-time the augmented reality image associated with the user identification that respects the viewer profile. Thus, the augmented reality image responds to movements of at least one of the physical model, e.g., user, and the viewer device.

Therethrough, the system provides augmented reality images of a user to himself and to others, aka viewing users, wherein the user controls the images they allow to be seen.

The method used to generate an augmented reality image, and further to generate a series of images where each image is based on a capture of a user and thereby allows the series of images to follow the movement of the user of the view.

Figure 8:
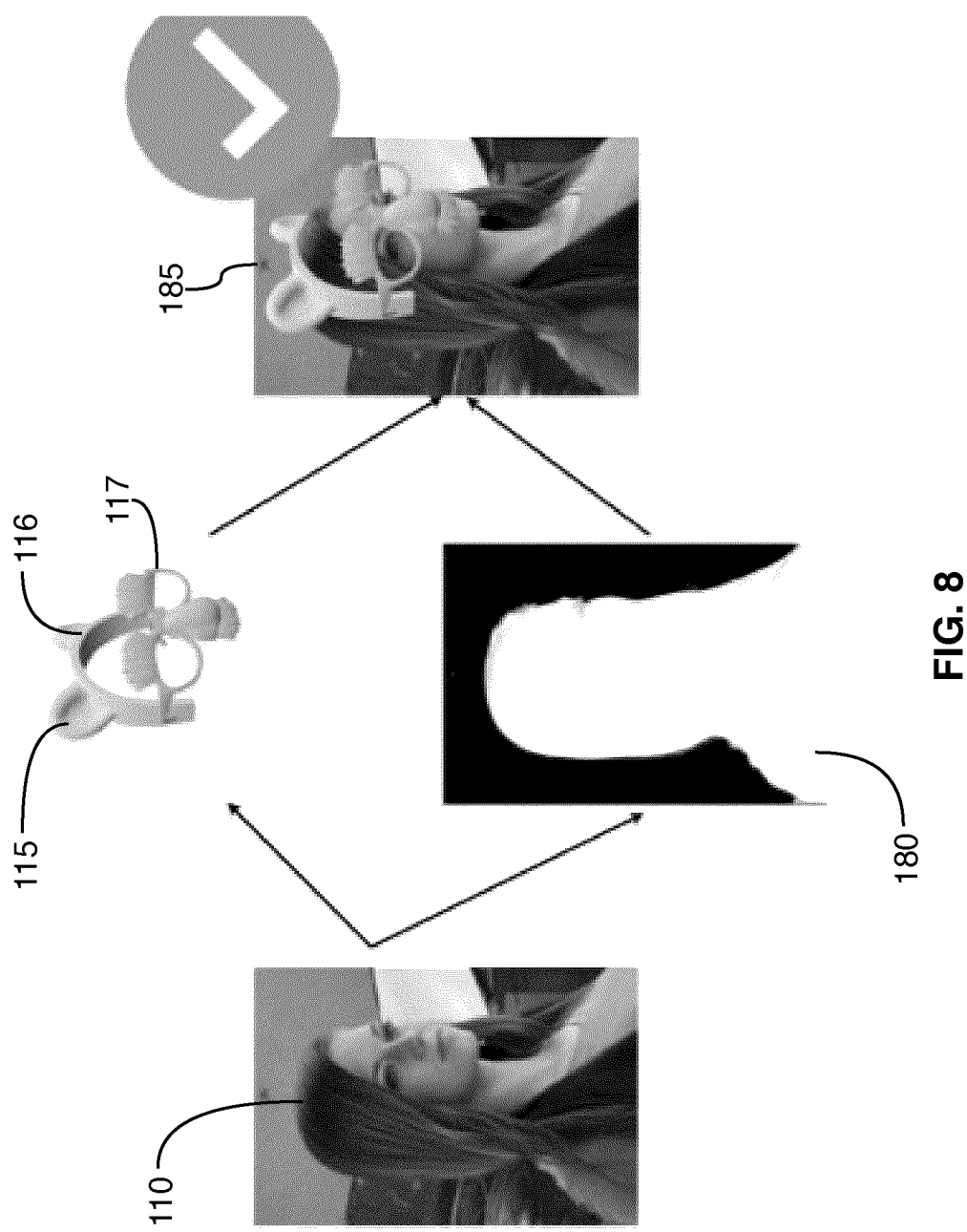
FIG. 8 is schematically depicting the process of image capture of a user, digital mapping, combination with virtual goods, and generation of an augmented reality image of the user with virtual goods.

As depicted on FIG. 8, to perform a segmentation process based on an image capture of the physical model, e.g., a user, through a camera. The segmentation process recognizes a physical model, in the present example the user 110 and the silhouette of the user 110. In other words, the system defines a (negative) digital 3D mapping 180, so that the software can make objects appear behind them. When the camera image is blended with the virtual goods 115, the software set a depth for the extracted segments regarding the content of the other layers and calculate therefrom an occlusion value used to generate the augmented reality image 185.

It should be noted that the recognizing of the human silhouette may be, and more precisely, is preferably combined with a pose estimation algorithm to establish a facing direction of the user relative to the image capture camera, to orientate the virtual objects, or more precisely the digital 3D models of the virtual objects accordingly. Thereby, it allows to determine the parts of the virtual objects that should be visible and the ones that should be hidden. For instance, the image on FIG. 8 depicts a first virtual good 116 and a second virtual good 117 to be displayed in the head zone, wherein the layering and the blending of the virtual goods 116 and 117 result in the first virtual good 116 hiding a portion of the second good 117, and parts of both the first virtual good 116 and the second virtual good 117 being hidden by the image of the user.

It should be noted that the software allows to customize the layering and/or blending of the virtual goods. In the example depicted on FIG. 8, another user who would own the first object and the second object may decide to structure the hierarchy of the layering opposed to the one depicted; what would result in the arm of the glasses (virtual good 117) being partially hidden behind the virtual good 116.

The software allows to generate and process simple and complex virtual goods. Complex objects may for instance be made of multiple elements (aka sub-goods) or individual virtual goods assembled according to overlaying and/or blending parameters. Once combined, a complex virtual good may be processed like a simple (opposed to complex) virtual good, allowing to associate similar parameters therewith. Some complex virtual goods may all take place in the same zone, or alternatively be displayed to cover/enter at least partially in at least two zones.

Referring to FIG. 6, the augmented reality experience may be divided in two types of experiences: a user experience and a viewing user experience.

The user experience comprises setting display preference data comprising association of zones, areas, hierarchy for layering, and other parameters used to set the way the objects will be displayed. The user experience also comprises to set display policy comprising viewer profile parameters associated with each of the items, whereby the system determines whether to integrate items in the enhanced digital 3D model based on correspondence between the display policy and the viewer profile parameter.

The experience of the viewing user consists essentially in detecting the user using a viewer device; the viewer device transmitting a viewer profile and a user identification to a server; the viewer device data necessary to generate and display in real time the augmented reality images on the viewer device that respect the viewer profile.

It should be noted that the augmented reality image used herein refer also to an animation, video and/or sequence of augmented reality images that relate to the same physical model, e.g., user. The process for generating and displaying augmented reality images and videos are typically performed live, in real time, which results in any of the physical model/user and/or the viewing user moving resulting in live modifications of the images or video displayed to the viewing user. In other words, the system responds live to relative movements of the physical model (e.g., user) and the viewing user.

It is worth noting that the previous examples exploit the user as both the person managing the adornment configuration through which virtual objects are blended to a physical model and also the physical model. In other realizations, the user may associate virtual goods to be blended to a different physical model, e.g., a building or a car, for which the user owns the customization rights. Thus, in the latter exemplary case, the user may register a building to an account, and apply virtual goods (e.g., fonts and effects) to the building so that viewing users passing by the building would see through their smart device the augmented reality version of the building, which may change based on the viewing angle of the viewing device relative to the building.

It is also worth noting that the present description contemplates therethrough the display of augmented reality images of the user of a smart device or a desktop with a camera, regardless of the person in front of the camera having an augmented reality version of themselves displayed is the owner of the use account. Thus, in cases the user is also the viewing user while in other cases some or all viewing users may be distinct from the user.

Figure 9:
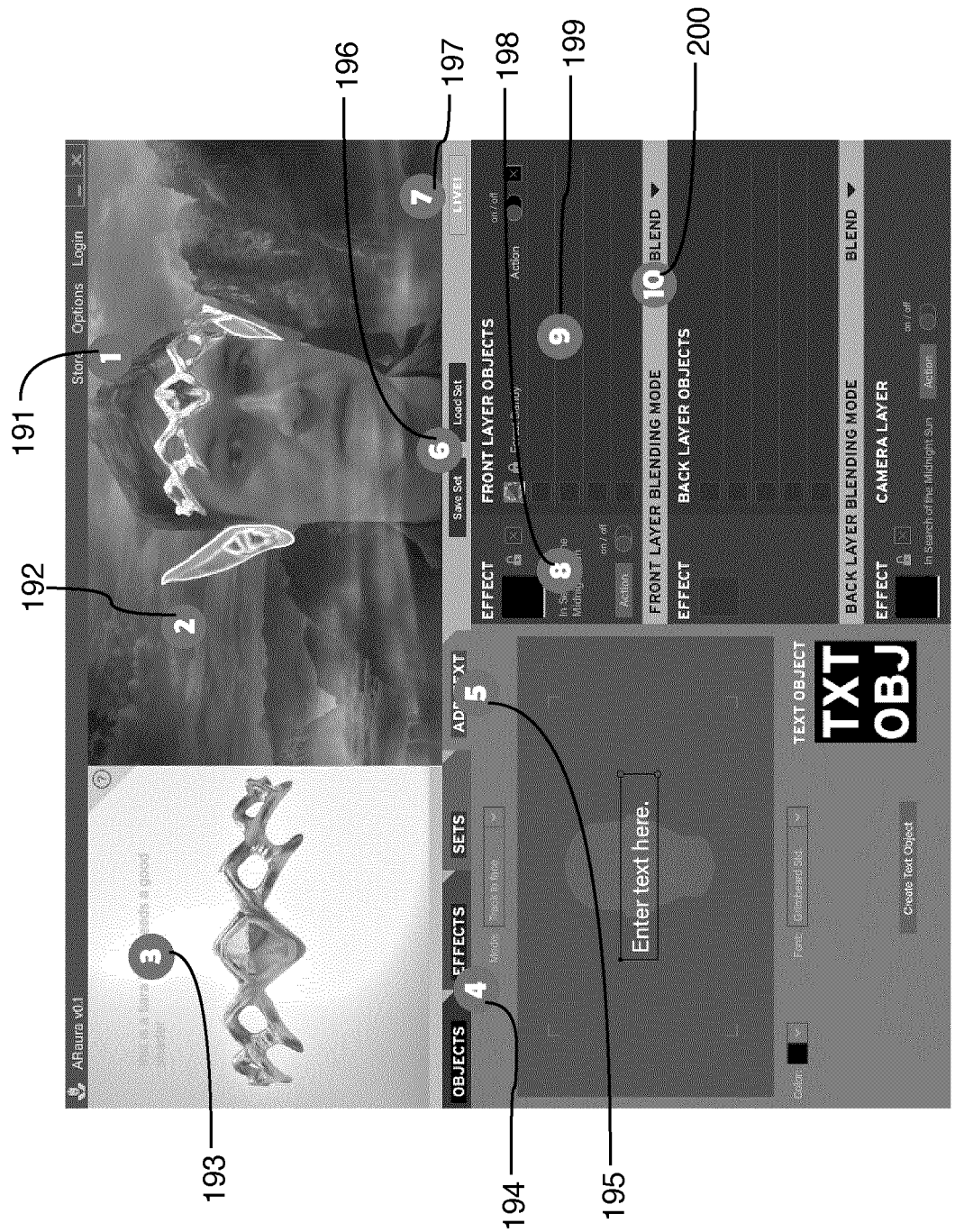
FIG. 9 is an exemplary user interface providing an experience to the user in the ecosystem.

Referring now to FIG. 9, it provides an exemplary user interface (UI) for a user to customize their augmented reality image.

A server cluster 140 (FIG. 1) comprising one or more backbone server(s) that are potentially operating in a decentralized manner through tasks distribution procedure such as remote procedure calls), not depicted on FIG. 6, is in communication through, e.g., Internet, with a user device and a viewer device, The server cluster is adapted to provide the user experience and the viewing user experience. The UI of a e.g., desktop computer, comprises a link 191 to a store where user can buy more objects and effects for their collection. Area 192 is a space for a video feed augmented reality images. Area 193 a is digital clothing item card with item rarity displayed by color code at bottom. Item blurb and/or artist information is provided on the back. Area 194 is to display user's collection of digital clothing objects and effects. A custom text tool 195 allows creation of text objects overlaid on video feed. A set management tool 196 is provided to so that outfits can be saved. Control 197 allows to go live and thereby activate on the ecosystem. Tool 198 allows to have effects being dragged to a forward or backward layering. They can be turned On and Off, locked, or removed here. Effects with actions are activated using the control 198. Area 199 is where objects are separated into front and back layerings to control how an outfit looks. Individual objects can be locked, turned On/Off, or removed in area 199. Objects with actions are further activated in area 199. Control 200 is a control to enter a layer blending mode so that objects effects fit well together visually.

Exemplary UI on a mobile device such a smart phone (not depicted) typically comprises most of the elements of the UI described before, and further comprises a notification, localization, recognition, and viewer components allowing a viewing user to view another user through augmented reality images, wherein the augmented reality images are enhanced videos of the video capture of the user enhanced with the described virtual items.

It is worth noting that the term recognition and other processes related thereto may involve one or more methods and/or technologies comprising: facial recognition, beacon technology, QR code, body recognition Bluetooth™ permissions &/or any other means to recognize the user.

It contemplates the identification method may involve any of the following technologies: PINs, or QR codes, RF ID's (Radio Frequency ID) and NFC's (Near Field Communication) or custom image recognition alone or in conjunction with facial recognition (particularly during the pandemic).

The server cluster manages datasets allowing a personal processing device to generate and display augmented reality images comprising a composite view of a) a physical model captured by the personal processing device, b) virtual goods. The server cluster comprising at least one server comprising a processing unit, a memory, and a communication interface. The server cluster is adapted to store a first digital model of the virtual goods each, e.g., associated with the user account; to store an identification of at least one of the physical model and a device associated with the user account; to store display preference data comprising a blending method of the virtual goods with a captured image of the physical model; to receive from the personal processing device identification data generated by an identification method; to retrieve the digital model and the blending method associated therewith based on identification data; and to transmit the digital model and the blending method to the personal processing device.

It is herein contemplated that the server cluster may be adapted to store display parameters associated with the digital model, wherein to generate the augmented reality image comprises displaying an image of the virtual good based on the display parameters of the first digital model, and wherein the display parameters comprise at least one of a time-based parameter, a position-based parameter, an event-based parameter, and a view-angle-based parameter.

It is herein contemplated that the server cluster may be adapted to store a display policy comprising a viewer profile parameter associated with the first virtual good; to receive a viewer profile of a viewing user, wherein the viewer profile comprises at least one viewer profile parameter; and to determine whether or not to transmit the first virtual good based on correspondence between the display policy and the viewer profile parameter.

It is herein contemplated that the server cluster may be adapted to associate with and to store ownership data of the first virtual good; to evaluate the ownership data of the first virtual good; and if the evaluation of the ownership data does not fulfill a requirement, to prevent at least one of: transferring or accepting transfer of the first virtual good; modifying or accepting modification of the first virtual good; and the first digital model to be transmitted to the personal processing device for the first virtual good to be viewed or manipulated in any way on a personal processing device.

It is herein further contemplated that the user account has account parameters associated therewith, wherein the server cluster is adapted to store a viewer account having account parameters associated therewith; to receive identification of the viewer account; to establish a view dataset based on comparison of the account parameters of the user account to the account parameters of the viewer account; and to identify a respecting one of the at least one virtual good associated with the user account that respects the view dataset, wherein the first digital model is of the respecting virtual good.

It is herein contemplated that the server cluster may store security credentials and security keys, and wherein the server cluster is adapted to combine security keys queried from its memory and received from the personal processing device and to compare the combined key with the security credentials to identify the virtual good.

It is herein contemplated that the server cluster may be adapted to store a plurality of user accounts, each associated with a user identification and account parameters. The cluster server is adapted to receive data allowing to establish a user account, and to retrieves or generate data used to generate augmented reality images based on the identification of the virtual goods associated with the account parameters of the identified user account.

It is herein contemplated that the server cluster may be adapted to receive data allowing the processing unit to establish a user account of a user and a user account of a viewer among the plurality of user accounts. The server cluster is adapted to generate or retrieve data used to generate augmented reality images based on comparison of the account parameters of the user account with the account parameters of the viewer account to establish a view dataset; and to identify the virtual goods that are associated with the user account with respect to the view dataset.

According to realizations and available processing power of the personal processing devices, the carry out of the method when sharing augmented reality images to a viewing device may require almost no P2P (person-to-person) processing (when all or almost all information and processing is performed on the cloud by the server cluster) to a great level of P2P processing (when the personal processing devices, e.g., exchange information directly with each other, exchange virtual goods, blending methods, rights, etc., directly to each other, and/or generate pre-processing, processing or post-processing for the other device). Other exemplary processes that may involve P2P includes detection of a physical model or a personal process device and identification or recognition of a user.

Therefore, it is contemplated that at least some of the steps of the present method and embodiments may be performed according to on-the-cloud protocols and/or P2P protocols based on e.g., characteristics of the environment (network speed for data transmission, processing power, etc.) and design considerations.

It should be remembered that the ecosystem comprises a marketplace allowing artists and creators to create, sell and modify virtual goods. The registry is designed to store and maintain a database of the virtual goods certificates, and associate rights to transfer, modify and display to themselves or on a viewing user's device an augmented reality image comprising one or more of the virtual goods owned.

More precisely, the registry maintains rights that permit to follow the ownership of a virtual goods over its life. Some rights that may be associated with an virtual good may include exclusive right versus right to transfer and/or resell the virtual good (with or without creative fees associated with the reselling), the right of the virtual good to remain unchanged, in other words integrity rights, versus rights for the current owner to modify the virtual good, try period rights during which the virtual good is temporarily transferred to a user and automatically removed from its collection when the try period has elapsed. Rights may also include private collection, in which the virtual good may not set to be visible by viewing users on their own devices, versus public wherein the object may be set to take part of an augmented reality image visible by others.

Accordingly, the described innovation provides a complete augmented reality platform and associated ecosystem that allows the expressive power of augmented reality to be live as an overlay onto the physical world and be experienced by a plurality of users in any physical space. The ecosystem allows for the democratization and facilitation of publishing and adorning via augmented reality to an open platform where users can create, edit, own, view, buy, sell, etc. a plurality of unique augmented reality virtual objects and aesthetic or utilitarian design elements. Further, the ecosystem allows for any users participating in the ecosystem to integrate one or more of the plurality of their purchased design elements into their daily real-world experiences. Additionally, the ecosystem provides a means for expanding the existing marketplace for goods and services into the augmented reality space.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A method to generate an augmented reality image comprising a composite view of a physical model and at least one virtual good associated with a user account, the method comprising:
    capturing with a processing device an image of the physical model associated with the user account;
    generating a digital mapping based on the captured image;
    having a display policy comprising a viewer profile parameter associated with a first virtual good among the at least one virtual good;
    determining a viewer profile for a viewer, wherein the viewer profile comprises at least one viewer profile parameter;
    generating an augmented reality image, comprising:

accessing an ownership registry listing the at least one virtual good associated with the user account comprising the first virtual good;

having a first digital model of the first virtual good;

determining whether or not to integrate the first virtual good in the augmented reality image based on correspondence between the display policy and the viewer profile parameter;

when determining to integrate the first virtual good in the augmented reality image, using the digital mapping to blend first digital model with the captured image into an augmented reality image; and displaying in real-time the augmented reality image on the processing device, wherein the augmented reality image responds to movements of at least one of the physical model and the processing device.

2. The method of claim 1, further comprising having display preference data used to establish a method of blending the first digital model with the captured image, wherein the step of generating the augmented reality image comprises determining the method of blending based to the display preference data.

3. The method of claim 2, wherein the step of blending the augmented reality image comprises:

establishing interference between the first digital model and the captured image; and resolving the interference according to the display preference data.

4. The method of claim 2, wherein the step of having display preference data comprises associating with the first digital model a position data set relative to the digital mapping.

5. The method of claim 2, wherein the digital mapping comprises a plurality of mapping points distributed in a plurality of zones, the plurality of zones comprising at least two of a head zone, a body zone, a halo zone and a vicinity zone, wherein the display preference data comprises an association of at least one of the mapping points located in at least one of the zones with the first virtual good.

6. The method of claim 1, comprising defining a plurality of display zones in the digital mapping, wherein one of said plurality of display zones is one of a front zone, a digital mapping zone, and a background zone, and associating one of the plurality of display zones to the first virtual good.

7. The method of claim 1, comprising associating display parameters with the first digital model, wherein the step of generating the augmented reality image comprises displaying an image of the first virtual good based on the display parameters of the first digital model, and wherein the display parameters comprise at least one of a time-based parameter, a position-based parameter, an event-based parameter, and a view-angle-based parameter.

8. The method of claim 1, further comprising evaluating if an ownership status associated with the first virtual good fulfills a requirement, and upon the ownership status failing to fulfil the requirement, preventing at least one of:

displaying the first virtual good to the user; and displaying the first virtual good to a viewer.

9. The method of claim 1, wherein the first virtual good is one of a 3D object, a 2D object, an adornment, an aura, a font, a script, an effect, an environmental element, a sound, and a virtual pet.

10. The method of claim 1, wherein the first virtual good is made of a plurality of combined virtual sub-goods.

11. The method of claim 1, further comprising:

the user selecting a layering characteristic for a first one of the at least one virtual goods; and the user selecting a second layering characteristic for a second one of the at least one virtual good, wherein the first layering characteristic and the second layering characteristic are structured hierarchically.

12. The method of claim 1, further comprising:

detecting the physical model using a viewer device applying an identification method over the physical model;

the viewer device transmitting the viewer profile and an identification of at least one of the physical model and a user account to at least one server; and the viewer device receiving a view authorization from at least one of the one server, wherein the viewer device is adapted to:

generate the augmented reality image of the physical model; and display the augmented reality image to the viewer.

13. The method of claim 12, wherein the identification method over the physical model comprises at least one of:

managing a notification;

detecting a beacon generated by a user's device; and performing an image recognition process of the physical model.

14. The method of claim 1, wherein the physical model is one of the user's body, the user's head, and a physical object owned by the user.

15. The method of claim 1, comprising:

associating ownership data with a first one of the at least one virtual good;

evaluating the ownership data in association with the first virtual good; and when the step of evaluating the ownership data does not fulfill a requirement, preventing at least one of:

displaying the first virtual good to the user; and displaying the first virtual good to a viewer.

16. The method of claim 15, wherein the ownership registry stores information regarding at least one of value history, provenance data, chain of ownership and commoditization of the first virtual good.

17. A server cluster for managing datasets allowing to transmit data to be used by a personal processing device to display an augmented reality image comprising a composite view of a) a physical model captured by the personal processing device and b) at least one virtual good, wherein the physical model and the at least one virtual good are associated with a user account, the server cluster comprising at least one server comprising a processing unit, a memory and a communication interface, wherein the server cluster is adapted:

on the memory, to store a first digital model of a first one of the at least one virtual good each associated with the user account;

on the memory, to store an identification of at least one of the physical model and a device associated with the user account;

on the memory, to store a display policy comprising a viewer profile parameter associated with the first virtual good;

on the memory, to store display preference data comprising a blending method of the first virtual good with a captured image of the physical model;

through the communication interface, to receive, from the personal processing device, identification data generated according to an identification method;

through the communication interface, to receive a viewer profile of a viewer, wherein the viewer profile comprises at least one viewer profile parameter;

using the processing unit, to determine whether or not to transmit the first virtual good based on correspondence between the display policy and the viewer profile parameter;

using the processing unit, when determination is to transmit the first virtual good, to retrieve the first digital model from the memory and the blending method associated therewith based on the identification data; and using the communication interface, transmitting the first digital model and the blending method to the personal processing device, wherein the personal processing device is adapted to display in real-time the augmented reality image generated based on the captured image, on the first digital model and on the blending method, and wherein the augmented reality image responds to movements of at least one of the physical model and the personal processing device.

18. The server cluster of claim 17, wherein the server cluster is further adapted, on the memory, to store display parameters associated with the first digital model, wherein to generate the augmented reality image comprises displaying an image of the first virtual good based on the display parameters of the first digital model, and wherein the display parameters comprise at least one of a time-based parameter, a position-based parameter, an event-based parameter, and a view-angle-based parameter.

19. The server cluster of claim 17, wherein the server cluster is further adapted:

on the memory, to associate with and to store ownership data of the first virtual good;

using the processing unit, to evaluate the ownership data of the first virtual good; and using the processing unit, if the evaluation of the ownership data does not fulfill a requirement, to prevent at least one of:

transferring or accepting transfer of the first virtual good;

modifying or accepting modification of the first virtual good; and the first digital model to be transmitted to the personal processing device.

20. The server cluster of claim 17, wherein the user account has account parameters associated therewith, wherein the server cluster is further adapted:

on the memory, to store a viewer account having account parameters associated therewith;

through the communication interface, to receive identification of the viewer account;

using the processing unit, to establish a view dataset based on comparison of the account parameters of the user account to the account parameters of the viewer account; and using the processing unit, to identify a respecting one of the at least one virtual good associated with the user account that respects the view dataset, wherein the first digital model is of the respecting virtual good.

* * * * *